(12) United States Patent
Ryan (10) Patent No.: US 6,560,056 B1
(45) Date of Patent: May 6, 2003

(54) DISK DRIVE COMPRISING A MOTOR DRIVER IC EMPLOYING A SERIAL INTERFACE FOR INITIATING THE TRANSMISSION OF REAL-TIME STATUS DATA TO A CONTROLLER IC

(75) Inventor: Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 330 days.

(21) Appl. No.: 09/775,158

(22) Filed: Jan. 31, 2001

(51) Int. Cl.$^7$ ............................ G11B 15/18; G11B 15/46
(52) U.S. Cl. ...................... 360/69; 360/73.03; 360/71; 318/254
(58) Field of Search ...................... 360/69, 55, 73.03, 360/71; 318/254, 138, 276

(56) References Cited

U.S. PATENT DOCUMENTS

| | | | |
|---|---|---|---|
| 5,471,353 A | 11/1995 | Codilian et al. | |
| 5,543,697 A | 8/1996 | Carobolante et al. | |
| 6,094,020 A | 7/2000 | Goretzki et al. | |
| 6,104,566 A | 8/2000 | Stephenson | |
| 6,160,368 A | 12/2000 | Plutowski | |
| 6,369,534 B1 * | 4/2002 | Menegoli | 318/254 |
| 6,498,446 B1 * | 12/2002 | Menegoli et al. | 318/254 |
| 2002/0084760 A1 * | 7/2002 | Messenger et al. | 318/439 |

* cited by examiner

Primary Examiner—Andrew L. Sniezek
(74) Attorney, Agent, or Firm—Milad G. Shara, Esq.; Howard H. Sheerin, Esq.

(57) ABSTRACT

A disk drive is disclosed comprising a disk, a head actuated radially over the disk, a spindle motor for rotating the disk, a controller integrated circuit (IC) for generating spindle motor control data, and a motor driver IC. The motor driver IC comprises commutation circuitry for commutating the spindle motor, a status register for storing real-time status data associated with operation of the motor driver IC, and a serial interface for receiving the spindle motor control data from the controller IC and for initiating a transfer of the real-time status data to the controller IC.

20 Claims, 6 Drawing Sheets

DISK DRIVE COMPRISING A MOTOR DRIVER IC EMPLOYING A SERIAL INTERFACE FOR INITIATING THE TRANSMISSION OF REAL-TIME STATUS DATA TO A CONTROLLER IC

BACKGROUND OF THE INVENTION

1. Field of the Invention

The present invention relates to disk drives for computer systems. More particularly, the present invention relates to a disk drive comprising a motor driver IC employing a serial interface for initiating the transmission of real-time status data to a controller IC.

2. Description of the Prior Art

Figure 1:
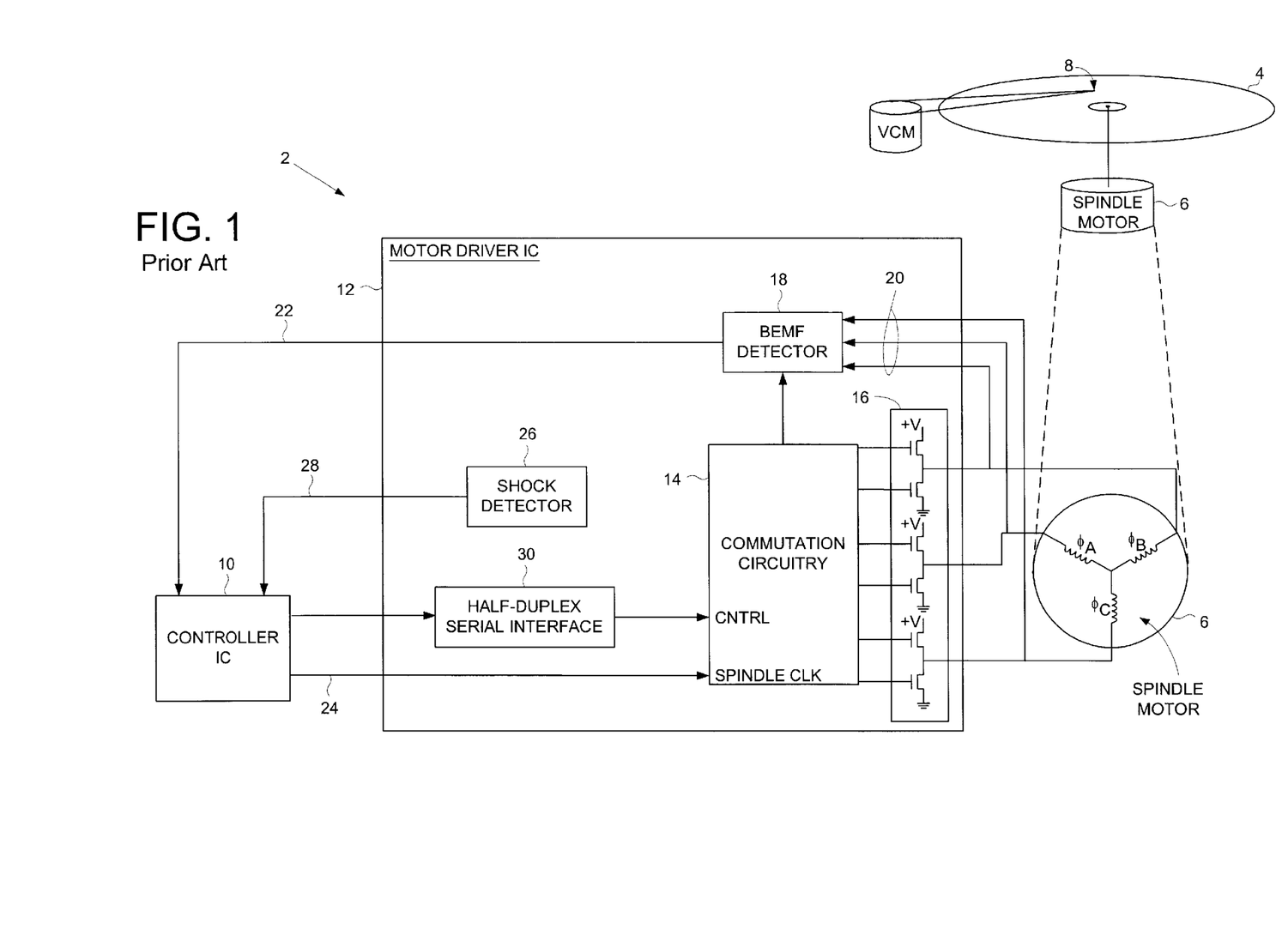
FIG. 1 shows a prior art disk drive comprising a motor driver IC utilizing dedicated lines to transmit real-time information to a controller IC, such as a BEMF zero-crossing signal or a shock detect signal.

FIG. 1 shows a prior art disk drive 2 comprising a disk 4 rotated by a spindle motor 6 while a head 8 is actuated radially over the disk 4 in order to write data in concentric data tracks. The spindle motor 6 typically comprises a three-phase brushless DC motor having three windings that must be commutated in an appropriate sequence to achieve a desired spin speed. The disk drive 2 comprises a closed-loop servo control system which monitors the angular position of the spindle motor in order to commutate the windings at the appropriate time. One known method for determining the spindle motor's angular position is to monitor zero-crossings in the back EMF (BEMF) voltage generated by the three windings. A BEMF detector monitors the analog BEMF voltage and generates a square wave signal indicative of the BEMF voltage crossing the zero-level threshold.

As shown in FIG. 1, a controller integrated circuit (IC) 10 communicates with a separate motor driver IC 12. The controller IC 10 comprises control logic for configuring and controlling the motor driver IC 12, and the motor driver IC 12 comprises the commutation circuitry 14 and power FET circuitry 16 for controlling the spindle motor 6. The motor driver IC 12 also comprises a BEMF detector 18 for detecting zero-crossings in the BEMF voltage 20 generated by the three windings (φA, φB, φC) in the spindle motor 6. The zero-crossing signal is transmitted to the controller IC 10 over a line 22 dedicated to transmitting the zero-crossing signal only, and the controller IC 10 processes the zero-crossing signal to generate a spindle clock signal transmitted to the motor driver IC 12 over another line 24 dedicated to transmitting the spindle clock signal only. The spindle clock signal cycles the commutation circuitry 16 at the appropriate time. The motor driver IC 12 may also comprise a shock detector 26 for generating a shock detect signal transmitted to the controller IC 10 over yet another line 28 dedicated to transmitting the shock detect signal only. The controller IC 10 may respond to the shock detect signal by inhibiting a write operation. The motor driver IC 12 comprises a half-duplex serial interface 30 for receiving control data from the controller IC 10 and for sending data to the controller IC 10 when requested by the controller IC 10.

Using a dedicated line to transmit the zero-crossing signal from the motor IC to the controller IC minimizes jitter which would otherwise degrade performance of the spindle motor control. However, it is also desirable to minimize the pin count of the motor driver IC as well as the controller IC in order to reduce the packaging cost. There is, therefore, a need to reduce the pin count with respect to the signals transmitted between the controller IC and the motor driver IC while minimizing jitter in the BEMF zero-crossing signal.

SUMMARY OF THE INVENTION

The present invention may be regarded as a disk drive comprising a disk, a head actuated radially over the disk, a spindle motor for rotating the disk, a controller integrated circuit (IC) for generating spindle motor control data, and a motor driver IC. The motor driver IC comprises commutation circuitry for commutating the spindle motor, a status register for storing real-time status data associated with operation of the motor driver IC, and a serial interface for receiving the spindle motor control data from the controller IC and for initiating a transfer of the real-time status data to the controller IC.

In one embodiment, the serial interface initiates the transfer of the real-time status data to the controller IC when the real-time status is modified by the motor driver IC. In another embodiment, the motor driver IC further comprises a back EMF (BEMF) detector responsive to a plurality of BEMF signals generated by the spindle motor. The BEMF detector generates a BEMF zero-crossing signal indicative of at least one of the BEMF signals crossing a predetermined threshold, wherein the real-time status data represents the BEMF zero-crossing signal. In one embodiment, the serial interface delays the transfer of the real-time status data for a predetermined transmission interval in order to minimize jitter in the BEMF zero-crossing signal. In yet another embodiment, the motor driver IC further comprises a shock detector for detecting an external shock to the disk drive and for generating a shock detect signal, wherein the real-time status data comprises the shock detect signal. In still another embodiment, the spindle motor control data comprises data representing a first edge of a spindle clock, the spindle clock for cycling the commutation circuitry, and the motor driver IC comprises a timer restarted by receipt of the spindle motor control data representing the first edge of the spindle clock, the timer for generating a second edge of the spindle clock at the end of a timed interval.

The present invention may also be regarded as a motor driver integrated circuit (IC) for use in a disk drive comprising a disk, a head actuated radially over the disk, a spindle motor for rotating the disk, and a controller IC for generating spindle motor control data. The motor driver IC comprises commutation circuitry for commutating the spindle motor, a status register for storing real-time status data associated with operation of the motor driver IC, and a serial interface for receiving the spindle motor control data from the controller IC and for initiating a transfer of the real-time status data to the controller IC.

The present invention may also be regarded as a controller integrated circuit (IC) for connecting to a motor driver IC within in a disk drive comprising a disk, a head actuated radially over the disk, and a spindle motor for rotating the disk. The motor driver IC for controlling the spindle motor and for generating real-time status data associated with operation of the motor driver IC. The controller IC comprises a means for generating spindle motor control data, a status register for receiving the real-time status data from the motor driver IC, and a serial interface for transmitting the spindle motor control data to the motor driver IC and for receiving the real-time status data from the motor driver IC, wherein the motor driver IC initiates the transmission of the real-time status data to the controller IC.

DESCRIPTION OF THE PREFERRED EMBODIMENTS

Figure 2:
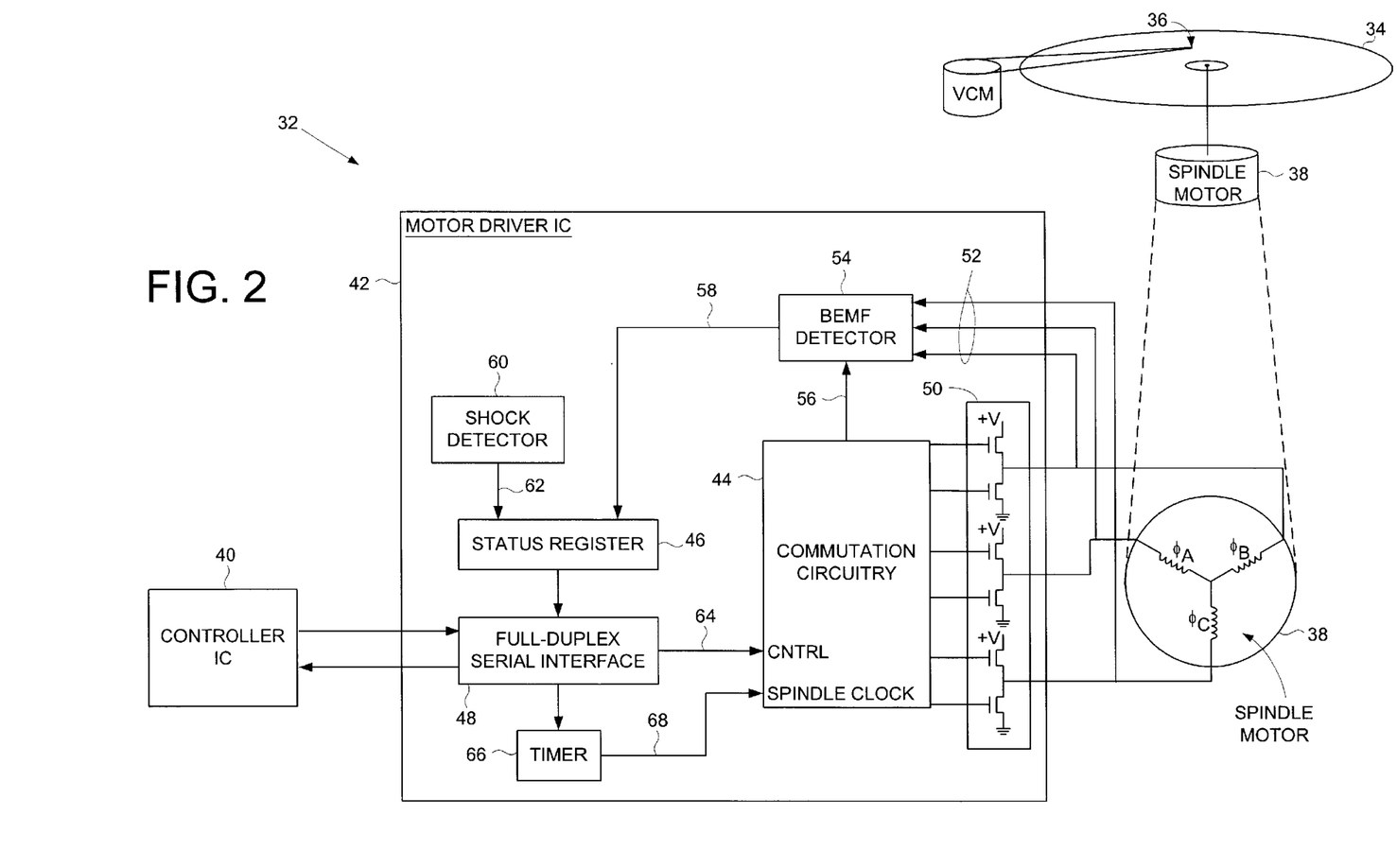
FIG. 2 shows a disk drive according to an embodiment of the present invention employing a motor driver IC comprising a real-time status register for storing real-time status data (e.g., BEMF zero-crossing, shock detect, etc.), and a full-duplex serial interface for initiating a transfer of the real-time status data to a controller IC.

FIG. 2 shows a disk drive 32 according to an embodiment of the present invention comprising a disk 34, a head 36 actuated radially over the disk 34, a spindle motor 38 for rotating the disk 34, a controller integrated circuit (IC) 40 for generating spindle motor control data, and a motor driver IC 42. The motor driver IC 42 comprises commutation circuitry 44 for commutating the spindle motor 38, a status register 46 for storing real-time status data associated with operation of the motor driver IC 42, and a serial interface 48 for receiving the spindle motor control data from the controller IC 40 and for initiating a transfer of the real-time status data to the controller IC 40.

In one embodiment, the spindle motor 38 is a three-phase DC brushless motor comprising three windings (φA, φB, φC). Torque is generated to rotate the spindle motor 38 by driving current through two of the windings at a time. The commutation circuitry 44 generates control signals for turning on and off a plurality of power FETs 50 which provide the driving current to the appropriate windings depending on the state of the commutation circuitry 44. Each of the windings generates a BEMF voltage signal 52 which are processed by a BEMF detector 54. The BEMF detector detects when the BEMF voltage signals 52 cross a predetermined threshold, such as zero (i.e., zero-crossing). The commutation circuitry 44 configures the BEMF detector 54 over line 56 to monitor the appropriate BEMF voltage signal 52 at the appropriate time. The BEMF detector 54 generates a BEMF zero-crossing signal 58, wherein in one embodiment the real-time status data stored in the status register 46 represents the BEMF zero-crossing signal 58. The controller IC 40 processes the BEMF zero-crossing signal 58 received via that serial interface 48 in order to commutate the motor drive IC 42 at the appropriate time.

In one embodiment, the motor driver IC 42 comprises a shock detector 60 for detecting external, physical shocks to the disk drive 32. The shock detector 60 generates a shock detect signal 62, wherein in one embodiment the real-time status data stored in the status register 46 represents the shock detect signal 62.

The serial interface 48 is a "full-duplex" serial interface meaning that the motor driver IC 42 can initiate a data transfer to the controller IC 40 as opposed to the "half-duplex" serial interface in the prior art disk drive 2 of FIG. 1 wherein the motor driver IC 12 transmits data to the controller IC 10 only when requested by the controller IC 10. The "full-duplex" functionality enables the motor driver IC 42 of FIG. 2 to consolidate the real-time status data (e.g., BEMF zero crossing, shock detect, etc.) into the status register 46 which is transmitted to the controller IC 40 at the appropriate time. Consequently, the dedicated lines of FIG. 1 are consolidated into the serial interface 48 of FIG. 2, thereby reducing the packaging cost of the motor driver IC 42 as well as the controller IC 40.

The "full-duplex" serial interface 48 is also capable of receiving data from the controller IC 40 in a transmission initiated by the controller IC 40. In one embodiment, the controller IC 40 configures the operating state of the commutation circuitry 44 by transmitting spindle motor control data to the motor driver IC 42 over the serial interface 48. The control data is used to configure the commutation circuitry 44 over line 64.

In one embodiment the spindle motor control data represents the rising edge of a spindle motor clock, wherein the spindle motor clock is for cycling the commutation circuitry 44. The motor driver IC 42 comprises a timer 66 restarted by receipt of the spindle motor control data representing the first edge of the spindle motor clock, wherein the timer for generating a second edge of the spindle motor clock at the end of a timed interval. The timer 66 outputs a pulse signal 68 representing the spindle motor clock. The commutation circuitry 44 changes state with each rising edge of the spindle motor clock 68 regardless as to the state of the timer 66. This allows the controller IC 40 to transmit rising edges of the spindle motor clock back-to-back, thereby cycling the commutation circuitry 44 through a number of states to reach a desired state.

With each rising edge of the spindle motor clock 68, the commutation circuitry 44 transmits control data over line 56 to disable the BEMF detector 54 after the change in commutation state since the BEMF voltage signals 52 will be invalid while current discharges from the deactivated winding. The BEMF detector 54 is disabled for the duration of the timer 66, and enabled with the falling edge of the spindle motor clock 68. In one embodiment, the time interval of the timer 66 is programmably adjusted to account for different operating modes of the spindle motor 38. In another embodiment, the commutation circuitry 44 is configured to allow the controller IC 40 to transmit multiple consecutive rising edges of the spindle motor clock 68 without advancing the state of the commutation circuitry 44, thereby disabling the BEMF detector 54 for a longer period.

In one embodiment, the serial interface 48 transmits data packets to the controller IC 40, wherein each data packet comprises a plurality of bits. A predetermined transmission interval is associated with the transfer of the plurality of bits in each data packet. The real-time status data stored in the status register 46 is transmitted in one or more of these data packets. When the BEMF signal 52 crosses the predetermined threshold, the serial interface 48 delays the transfer of the real-time status data for at least the predetermined transmission interval, thereby minimizing jitter in the BEMF zero-crossing signal 58 transmitted to the controller IC 40.

Figure 3:
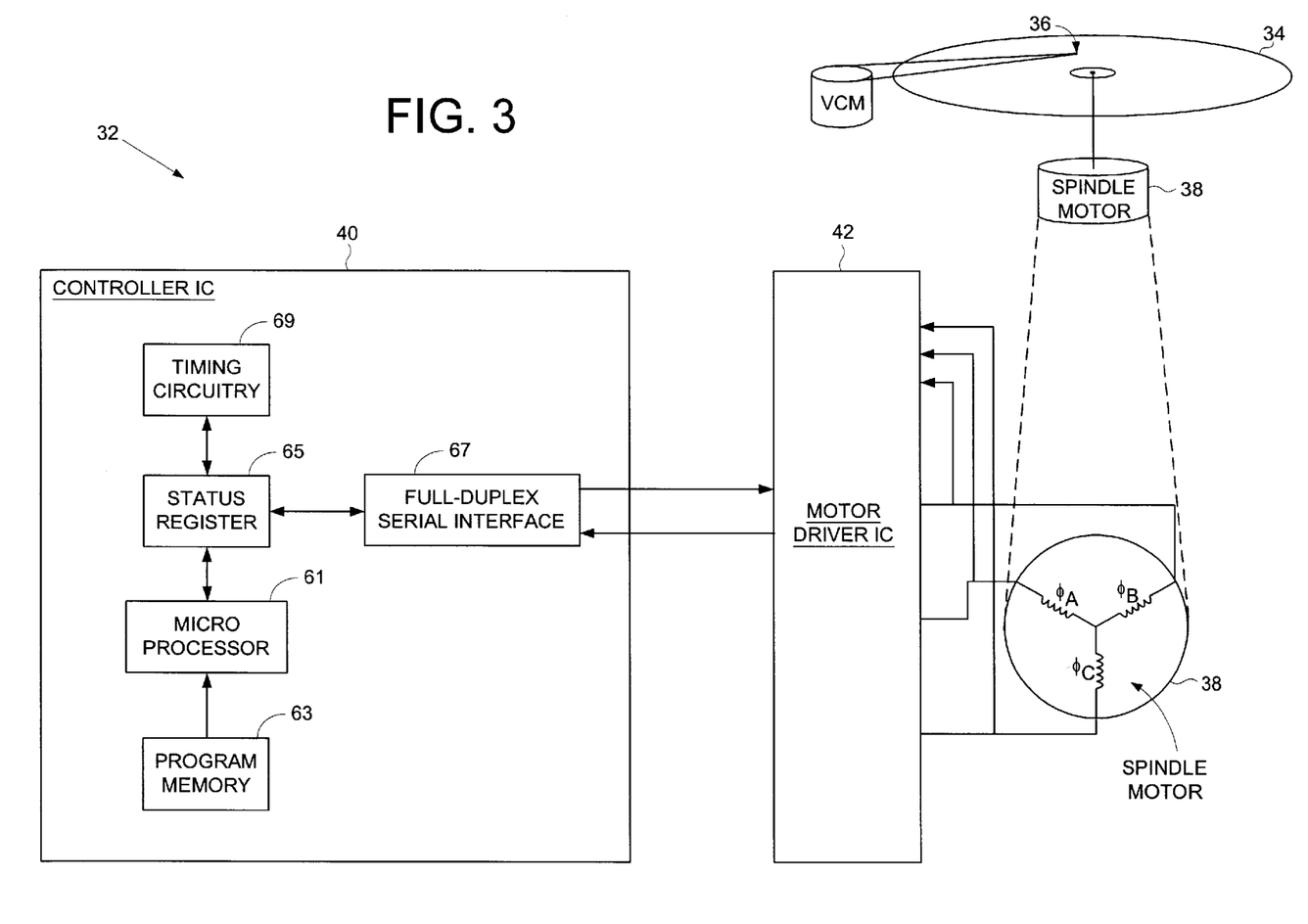
FIG. 3 shows details of the controller IC employed in the disk drive of FIG. 2 according to an embodiment of the present invention.

FIG. 3 shows further details of the controller IC 40 employed in the disk drive 32 of FIG. 2 according to an embodiment of the present invention. The controller IC comprises a means for generating spindle motor control data, wherein example means include a microprocessor 61 executing routines stored in a program memory 63 or circuitry implementing a state machine. The controller IC 40 further comprises a status register 65 for receiving the real-time status data associated with operation of the motor driver IC 42. The real-time status data is received from the motor driver IC 42 via a full-duplex serial interface 67 which is also used to transmit the spindle motor control data to the motor driver IC 42.

In the embodiment of FIG. 3, the controller IC 40 comprises timing circuitry 69 for processing the real-time status data representing the BEMF zero-crossing signal 58 received from the motor-driver IC 42 via the serial interface 67 and status register 65. The timing circuitry 69 generates the first edge of the spindle motor clock transmitted to the motor driver IC 42 via the status register 65 and serial interface 67. In another embodiment, the microprocessor 61 processes the real-time status data representing the BEMF zero-crossing signal 58 to generate the first edge of the spindle motor clock.

In one embodiment, the real-time status data received from the motor driver IC 42 and stored in the status register 65 generates an interrupt within the microprocessor 61 so that the microprocessor 61 will execute the appropriate routine stored in the program memory 63. In another embodiment, the microprocessor 61 polls the status register 65 to determine the current operating state of the motor driver IC 42.

Figure 4:
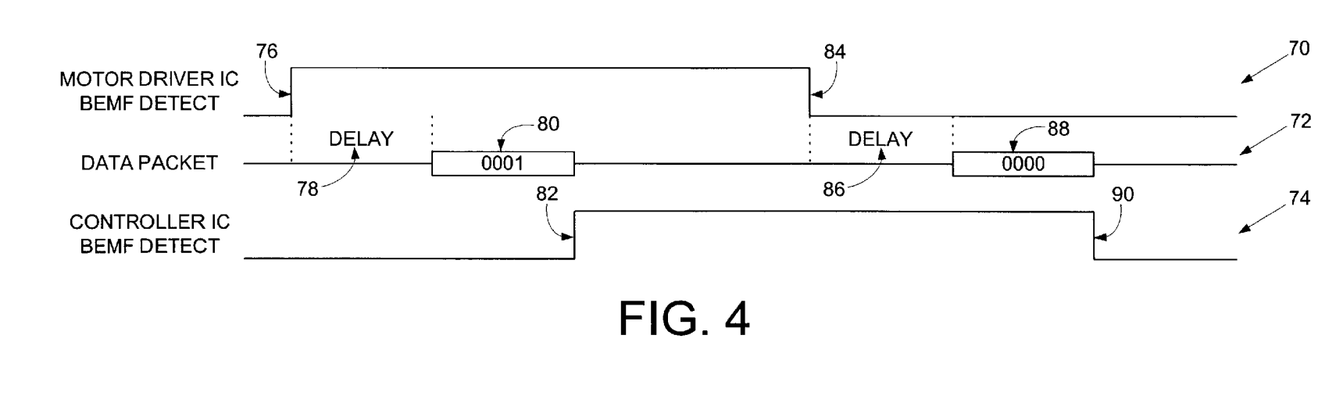
FIG. 4 is a timing diagram illustrating the serial transfer of a BEMF zero-crossing signal to the controller IC using a delay which minimizes jitter.

FIG. 4 is a timing diagram illustrating the serial transfer of the BEMF zero-crossing signal 58 to the controller IC 40 using a delay which minimizes jitter. The first waveform 70 represents the BEMF zero-crossing signal 58 generated by the BEMF detector 54, the second waveform 72 represents the transmission of the data packet comprising the real-time status data, and the third waveform 74 represents the BEMF zero-crossing signal as seen by the controller IC 40. At time 76 the BEMF zero-crossing signal 58 output by the BEMF detector 54 changes state indicating that the BEMF voltage signal 52 crossed the predetermined threshold (e.g., zero). The BEMF zero-crossing signal 58 starts a timer (not shown) having an interval at least as long as the predetermined transmission interval required to transmit a data packet to the controller IC 40. At the end of the time interval (delay 78), the real-time status data stored in status register 46 is transmitted to the controller IC 40 in data packet 80. At the end of the transmission (at time 82), the BEMF zero-crossing signal 74 as seen from the controller IC 40 changes state. At time 84, the BEMF zero-crossing signal 58 output by the BEMF detector 54 again changes state, and after delay 86, the real-time status data reflecting this event is transmitted in data packet 88 to the controller IC 40. At the end of the transmission (at time 90), the BEMF zero-crossing signal as seen by the controller IC 40 changes state.

Figure 5:
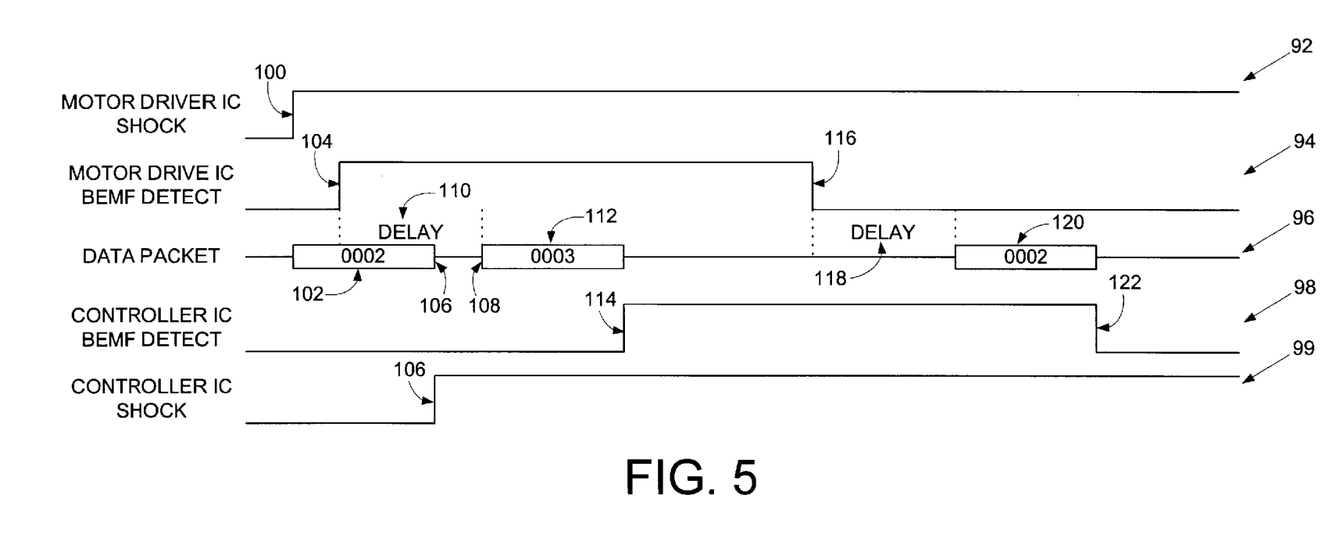
FIG. 5 is a timing diagram illustrating the serial transfer of a BEMF zero-crossing signal to the controller IC when another real-time event (e.g., shock detect) occurs immediately before the BEMF zero-crossing event.

Delaying the transmission of the real-time status data representing the BEMF zero-crossing signal 58 minimizes jitter in the back EMF zero-crossing signal as seen from the controller IC 40. This is understood by considering the timing diagram of FIG. 5 which illustrates the serial transfer of the BEMF zero-crossing signal 58 to the controller IC 40 when the BEMF zero-crossing event occurs immediately after another real-time event, such as a shock detect. The first waveform 92 in FIG. 5 represents the shock detect signal 62 generated by the shock detector 60 of FIG. 2, the second waveform 94 represents the BEMF zero-crossing signal 58 generated by the BEMF detector 54, the third waveform 96 represents the transmission of the data packet comprising the real-time status data, the fourth waveform 98 represents the BEMF zero-crossing signal as seen by the controller IC 40, and the fifth waveform 99 represents the shock detect signal as seen by the controller IC 40. At time 100 an external shock is detected and the shock detect signal 62 within the motor driver IC 42 is activated. Immediately after detecting the shock, the serial interface 48 begins transmitting a data packet 102 comprising the real-time status data stored in the status register 46 including the shock detect signal 62. At time 104 the BEMF detector 54 detects a zero-crossing in the BEMF voltage signals 52 and updates the status register 46. At time 106 the serial interface 48 finishes sending the data packet comprising the shock detect event and the shock detect signal 99 as seen by the controller IC 40 changes state. At time 108 (after delay 110), the serial interface 48 begins transmitting a data packet 112 comprising the real-time data stored in the status register 46 including the BEMF zero-crossing signal 58. At the end of the transmission (at time 114), the BEMF zero-crossing signal 98 as seen from the controller IC 40 changes state. At time 116 the BEMF zero-crossing signal 58 output by the BEMF detector 54 changes state, and after delay 118 the serial interface 48 begins transmitting a data packet 120 comprising the BEMF zero-crossing signal 58. At the end of the transmission (at time 122), the BEMF zero-crossing signal 98 as seen from the controller IC 40 changes state. The delays 110 and 118 prevent the shock detect signal at time 100 from interfering with the transmission of the BEMF zero-crossing signal and therefore minimize the jitter in the BEMF zero-crossing signal 98 as seen from the controller IC 40.

Figure 6:
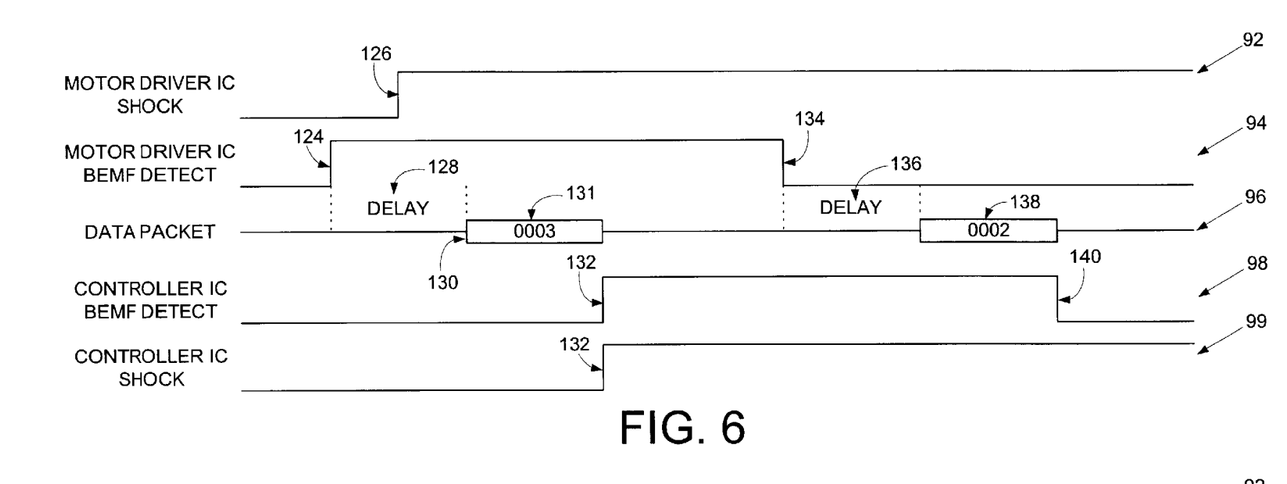
FIG. 6 is a timing diagram illustrating the serial transfer of a BEMF zero-crossing signal to the controller IC when another real-time event (e.g., shock detect) occurs immediately after the BEMF zero-crossing event.

FIG. 6 is a timing diagram illustrating the serial transfer of the BEMF zero-crossing signal 58 to the controller IC 40 when another real-time event (e.g., shock detect 62) occurs immediately after the BEMF zero-crossing event. At time 124 the BEMF detector 54 detects a zero-crossing in the BEMF voltage signals 52 and updates the status register 46. A short time thereafter at time 126, the shock detector 60 detects an external shock and activates the shock detect signal 62 to also update the status register 46. The serial interface 48 does not begin transmitting the real-time status data in the status register 46 until after delay 128 associated with the BEMF zero-crossing detected at time 124. At time 130 the serial interface 48 begins transmitting the data packet 131 comprising the real-time status data in the status register 46, including the shock-detect and BEMF zero-crossing events. At the end of the transmission (at time 132), the BEMF zero-crossing signal 98 and the shock detect signal 99 as seen from the controller IC 40 change state. At time 134 the BEMF zero-crossing signal 58 output by the BEMF detector 54 changes state, and after delay 136 the serial interface 48 begins transmitting a data packet 138 comprising the BEMF zero-crossing signal 58. At the end of the transmission (at time 140), the BEMF zero-crossing signal 98 as seen from the controller IC 40 changes state.

Figure 7:
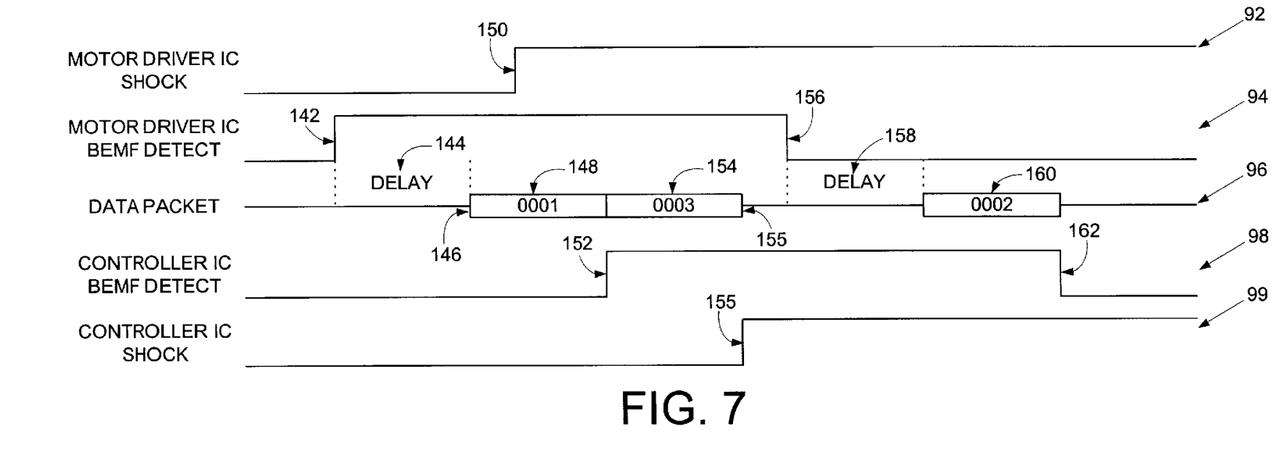
FIG. 7 is a timing diagram illustrating the serial transfer of a BEMF zero-crossing signal to the controller IC when another real-time event (e.g., shock detect) occurs during the serial transmission of the BEMF zero-crossing event.

FIG. 7 is a timing diagram illustrating the serial transfer of a BEMF zero-crossing signal 58 to the controller IC 40 when another real-time event (e.g., shock detect 62) occurs during the serial transmission of the BEMF zero-crossing event. At time 142 the BEMF detector 54 detects a zero-crossing in the BEMF voltage signals 52 and updates the status register 46. After a delay 144 at time 146 the serial interface 48 begins transmitting the data packet 148 comprising the real-time data stored in the status register 46 including the BEMF zero-crossing signal 58. During the transmission interval, at time 150 the shock detector 60 detects an external shock and activates the shock detect signal 62 to update the status register 46. At the end of transmitting data packet 148 at time 152 the BEMF zero-crossing signal 98 as seen from the controller IC 40 changes state. Concurrently, the serial interface 48 begins transmitting data packet 154 comprising the real-time status data stored in status register 46, including the shock detect signal 62 detected at time 150. At the end of the transmission (at time 155), the shock detect signal 99 as seen from the controller IC 40 changes state. At time 156 the BEMF zero-crossing signal 58 output by the BEMF detector 54 changes state, and after delay 158 the serial interface 48 begins transmitting a data packet 160 comprising the BEMF zero-crossing signal 58. At the end of the transmission (at time 162), the BEMF zero-crossing signal 98 as seen from the controller IC 40 changes state.

Figure 8:
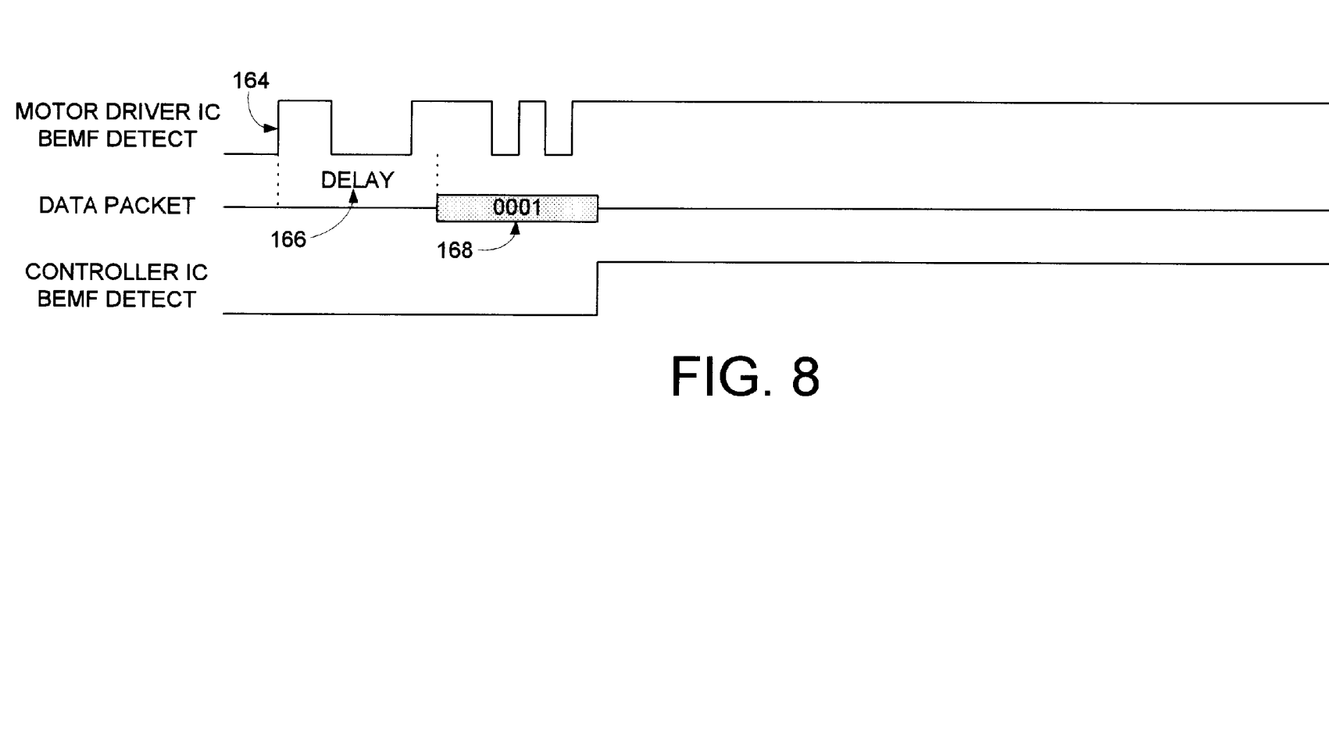
FIG. 8 is a timing diagram illustrating how the delay imposed on transmitting the BEMF zero-crossing signal helps to de-bounce the BEMF zero-crossing signal.

Once the BEMF zero-crossing signal 58 has been detected and the status register 46 updated, subsequent BEMF zero-crossing events are ignored until the real-time status data stored in the status register 46 has been transmitted to the controller IC 40. As shown in the timing diagram of FIG. 8, this feature helps de-bounce the BEMF zero-crossing signal 58. At time 164 the BEMF detector 54 detects a zero-crossing in the BEMF voltage signals 52 and updates the status register 46. Thereafter during delay 166 and during the transmission of data packet 168, the BEMF zero-crossing signal 58 changes state due to noise in the BEMF voltage signals 52. However, these BEMF zero-crossing events are ignored and a change in the BEMF zero-crossing signal 58 will not be recognized until the BEMF zero-crossing detected at time 164 has been transmitted to the controller IC 40.

I claim:

1. A disk drive comprising:
   (a) a disk;
   (b) a head actuated radially over the disk;
   (c) a spindle motor for rotating the disk;
   (d) a controller integrated circuit (IC) for generating spindle motor control data; and
   (e) a motor driver IC comprising:
      commutation circuitry for commutating the spindle motor;
      a status register for storing real-time status data associated with operation of the motor driver IC; and
      a serial interface for receiving the spindle motor control data from the controller IC and for initiating a transfer of the real-time status data to the controller IC.

2. The disk drive as recited in claim 1, wherein the serial interface initiates the transfer of the real-time status data to the controller IC when the real-time status data is modified by the motor driver IC.

3. The disk drive as recited in claim 1, wherein:
   (a) the motor driver IC further comprises a back EMF (BEMF) detector responsive to a plurality of BEMF signals generated by the spindle motor;
   (b) the BEMF detector for generating a BEMF zero-crossing signal indicative of at least one of the BEMF signals crossing a predetermined threshold; and
   (c) the real-time status data represents the BEMF zero-crossing signal.

4. The disk drive as recited in claim 3, wherein
   (a) the serial interface transmits data packets to the controller IC;
   (b) each data packet comprises a plurality of bits;
   (c) a predetermined transmission interval is associated with the transfer of the plurality of bits in each data packet;
   (d) one of the packets comprises at least part of the real-time status data; and
   (e) when the BEMF signal crosses the predetermined threshold, the serial interface delays the transfer of the real-time status data for at least the predetermined transmission interval.

5. The disk drive as recited in claim 1, wherein:
   (a) the motor driver IC further comprises a shock detector for detecting an external shock to the disk drive and for generating a shock detect signal; and
   (b) the real-time status data represents the shock detect signal.

6. The disk drive as recited in claim 1, wherein:
   (a) the spindle motor control data represents a first edge of a spindle clock;
   (b) the spindle clock for cycling the commutation circuitry; and
   (c) the motor driver IC comprises a timer restarted by receipt of the spindle motor control data representing the first edge of the spindle clock, the timer for generating a second edge of the spindle clock at the end of a timed interval.

7. The disk drive as recited in claim 6, wherein:
   (a) the motor driver IC further comprises a back EMF (BEMF) detector responsive to a plurality of BEMF signals generated by the spindle motor;
   (b) the BEMF detector for generating a BEMF zero-crossing signal indicative of at least one of the BEMF signals crossing a predetermined threshold; and
   (c) the BEMF detector is disabled for the timed interval.

8. A motor driver integrated circuit (IC) for use in a disk drive comprising a disk, a head actuated radially over the disk, a spindle motor for rotating the disk, and a controller IC for generating spindle motor control data, the motor driver IC comprising:
   (a) commutation circuitry for commutating the spindle motor;
   (b) a status register for storing real-time status data associated with operation of the motor driver IC; and
   (c) a serial interface for receiving the spindle motor control data from the controller IC and for initiating a transfer of the real-time status data to the controller IC.

9. The motor driver IC as recited in claim 8, wherein the serial interface initiates the transfer of the real-time status data to the controller IC when the real-time status data is modified by the motor driver IC.

10. The motor driver IC as recited in claim 8, wherein:
    (a) the motor driver IC further comprises a back EMF (BEMF) detector responsive to a plurality of BEMF signals generated by the spindle motor;
    (b) the BEMF detector for generating a BEMF zero-crossing signal indicative of at least one of the BEMF signals crossing a predetermined threshold; and
    (c) the real-time status data represents the BEMF zero-crossing signal.

11. The motor driver IC as recited in claim 10, wherein
    (a) the serial interface transmits data packets to the controller IC;
    (b) each data packet comprises a plurality of bits;
    (c) a predetermined transmission interval is associated with the transfer of the plurality of bits in each data packet;

(d) one of the packets comprises at least part of the real-time status data; and (e) when the BEMF signal crosses the predetermined threshold, the serial interface delays the transfer of the real-time status data for at least the predetermined transmission interval.

12. The motor driver IC as recited in claim 8, wherein:

(a) the motor driver IC further comprises a shock detector for detecting an external shock to the disk drive and for generating a shock detect signal; and (b) the real-time status data represents the shock detect signal.

13. The motor driver IC as recited in claim 8, wherein:

(a) the spindle motor control data represents a first edge of a spindle clock;

(b) the spindle clock for cycling the commutation circuitry; and (c) the motor driver IC comprises a timer restarted by receipt of the spindle motor control data representing the first edge of the spindle clock, the timer for generating a second edge of the spindle clock at the end of a timed interval.

14. The motor driver IC as recited in claim 13, wherein:

(a) the motor driver IC further comprises a back EMF (BEMF) detector responsive to a plurality of BEMF signals generated by the spindle motor;

(b) the BEMF detector for generating a BEMF zero-crossing signal indicative of at least one of the BEMF signals crossing a predetermined threshold; and (c) the BEMF detector is disabled for the timed interval.

15. A controller integrated circuit (IC) for connecting to a motor driver IC within in a disk drive comprising a disk, a head actuated radially over the disk, and a spindle motor for rotating the disk, the motor driver IC for controlling the spindle motor and for generating real-time status data associated with operation of the motor driver IC, the controller IC comprising:

(a) a means for generating spindle motor control data;

(b) a status register for receiving the real-time status data from the motor driver IC; and (c) a serial interface for transmitting the spindle motor control data to the motor driver IC and for receiving the real-time status data from the motor driver IC, wherein the motor driver IC initiates the transmission of the real-time status data to the controller IC.

16. The controller IC as recited in claim 15, wherein the motor driver IC initiates the transfer of the real-time status data to the controller IC when the real-time status data is modified by the motor driver IC.

17. The controller IC as recited in claim 15, wherein:

(a) the motor driver IC further comprises a back EMF (BEMF) detector responsive to a plurality of BEMF signals generated by the spindle motor;

(b) the BEMF detector for generating a BEMF zero-crossing signal indicative of at least one of the BEMF signals crossing a predetermined threshold; and (c) the real-time status data represents the BEMF zero-crossing signal.

18. The controller IC as recited in claim 17, wherein (a) the serial interface receives data packets from the motor driver IC;

(b) each data packet comprises a plurality of bits;

(c) a predetermined transmission interval is associated with the transfer of the plurality of bits in each data packet;

(d) one of the packets comprises at least part of the real-time status data; and (e) when the BEMF signal crosses the predetermined threshold, the motor driver IC delays the transfer of the real-time status data for at least the predetermined transmission interval.

19. The controller IC as recited in claim 15, wherein:

(a) the motor driver IC further comprises a shock detector for detecting an external shock to the disk drive and for generating a shock detect signal; and (b) the real-time status data represents the shock detect signal.

20. The controller IC as recited in claim 15, wherein:

(a) the controller IC comprises a program memory and a microprocessor for executing routines stored in the program memory; and (b) the real-time status data stored in the status register generates interrupts within the microprocessor.

* * * * *